Oct. 11, 1960

R. D. DREW ET AL 2,955,786

FOOT RETRACTION APPARATUS

Filed Dec. 18, 1956

INVENTORS
ROBERT D. DREW
KLAAS HENDRICKS

By George Sullivan
Agent

Oct. 11, 1960    R. D. DREW ET AL    2,955,786
FOOT RETRACTION APPARATUS
Filed Dec. 18, 1956    2 Sheets-Sheet 2
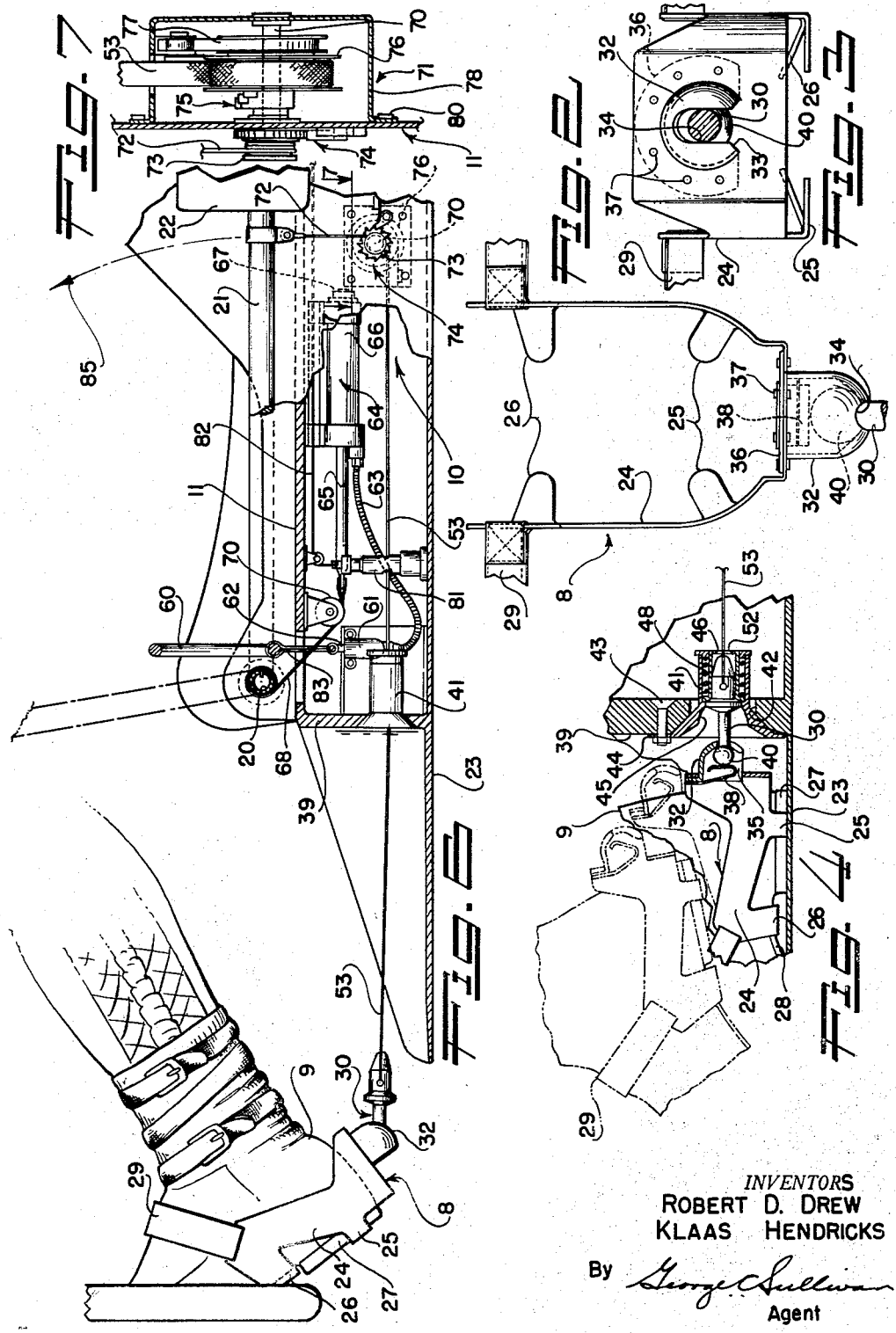
INVENTORS
ROBERT D. DREW
KLAAS HENDRICKS
By *George C. Sullivan*
Agent

United States Patent Office 2,955,786
Patented Oct. 11, 1960

2,955,786
FOOT RETRACTION APPARATUS

Robert D. Drew, Reseda, and Klaas Hendricks, Van Nuys, Calif., assignors to Lockheed Aircraft Corporation, Burbank, Calif.

Filed Dec. 18, 1956, Ser. No. 629,083

4 Claims. (Cl. 244—122)

This invention relates to occupant ejection devices for high speed airplanes and in particular to the construction of a foot retraction apparatus carried by such a seat for restricting the feet of a pilot, or occupant, from floundering caused by negative loads and oncoming air pressure and to hold the occupant's feet in proper position immediately prior to and during ejection from the airplane.

Heretofore, it has been conventional practice to employ flexible straps or clamps to secure the feet of a pilot to the ejection seat so that the tremendous oncoming air pressure encountered when the seat is ejected from the airplane will not cause injury to the pilot or seat instability due to feet and legs floundering. In order to operate and control his aircraft the pilot's legs and feet must be free to enable proper actuation of aircraft controls. Consequently, when an emergency evacuation of the aircraft appears apparent, the pilot was required to manually adjust and fasten the straps or clamps about his feet so that upon ejecting from the aircraft, the pilot would be seated properly in the ejection seat and his legs and feet firmly held against the seat.

Difficulties have been encountered when employing conventional means for retaining a pilot's feet which are partly due to the fact that the pilot must use valuable time to adjust and fasten the straps about his feet immediately prior to ejection. Furthermore, it is difficult to detach the straps or clamps from about the pilot's feet subsequent to ejection so that he may separate from the ejected seat and parachute down to earth.

These difficulties are obviated by the present invention wherein there is provided detachable means carried on each boot of the pilot which are adaptable to engage with retracting mechanism when the pilot initially sits in his seat. The retracting mechanism is arranged whereby the pilot's feet are allowed freedom of movement to properly operate the aircraft controls. In time of emergency, means are provided for actuating the retracting mechanism whereby the pilot's feet are forcibly pulled into position with respect to the seat and maintained in a restrained position immediately prior to and during ejection. When the pilot has reached the proper rate of deceleration and altitude, severing means are provided for releasing the retracting mechanism so that the pilot may easily separate from the ejected seat and parachute down to earth.

It is an object of the present invention to provide novel foot retraction apparatus employed in an aircraft escape system which permits the pilot free and unrestrained use of his feet and legs during normal flight and which automatically positions and restrains the pilot's feet against the seat during an emergency when the pilot desires to escape from his aircraft. When the feet are retracted, they are restrained from forward or vertical movement and in this condition, the feet cannot move freely until release is achieved by severing the retraction apparatus.

It is another object of the present invention to provide foot retraction apparatus for use in an aircraft escape system which is comfortable to the pilot and which does not require manual attachment to the pilot's feet during an emergency in which the pilot has to eject himself from the aircraft.

Still another object of the present invention is to provide a novel foot retraction and restraining apparatus for use in aircraft escape systems whereby the pilot's feet are easily attached or detached to the apparatus when entering or leaving the cockpit. However, the feet are allowed freedom of movement to operate aircraft controls until the pilot causes ejection of the seat.

Still a further object of the present invention is to provide means for releasing the restraining force on the pilot's feet whereby the pilot may separate from the ejected seat in order to actuate his parachute and descend to earth.

For a better understanding of the invention, reference should be made to the accompanying drawings, wherein:

Figure 3 is an end view of the retraction slipper shown in Figure 2;

Figure 4 is an elevational view partly in section showing the attachment of the slipper carried by the pilot's boot to the retraction apparatus;

Figure 5 is an enlarged sectional view showing the pilot's boot in its restrained position;

Figure 6 is an enlarged view showing the foot retraction apparatus of the present invention as provided on the ejection seat shown in Figure 1; and Figure 7 is a sectional view taken in the direction of arrows 7—7 of Figure 6 showing a clutch of the foot retraction apparatus.

Figure 1:
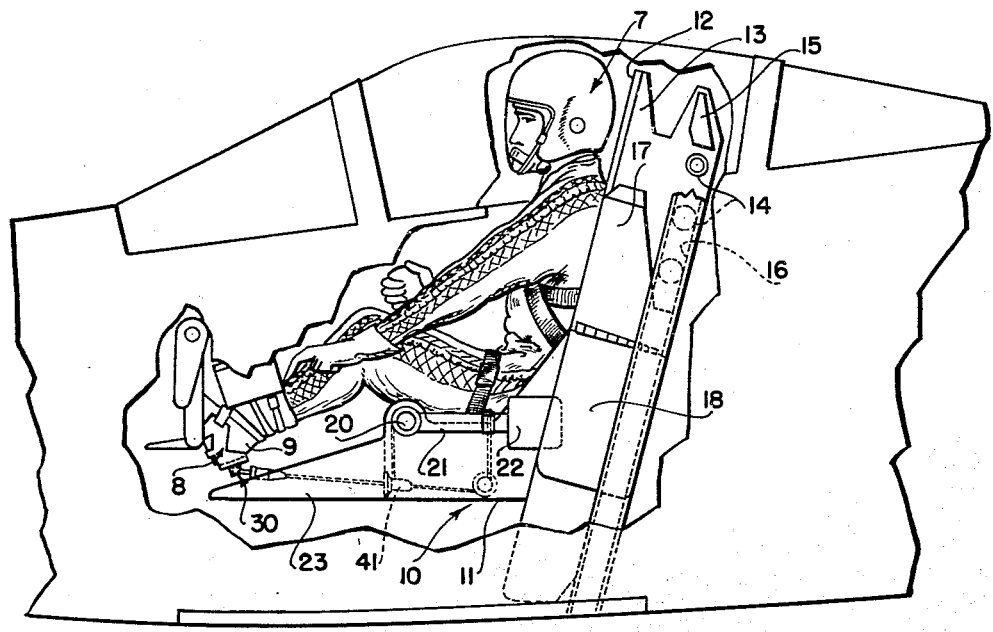
Figure 1 is a drawing of a pilot seated in an ejection seat of an aircraft showing a detachable slipper carried by the pilot's foot and the retraction means attached thereto in accordance with the present invention.

With reference to Figure 1, an aircraft escape apparatus is shown which illlustrates a pilot 7 seated in a basic seat arrangement wearing a retraction slipper 8 on his boot 9. Each slipper is coupled to a foot retraction means represented generally by the arrow 10. The basic seat arrangement comprises a seat 11 supporting the pilot, a seat back 12 supporting the back and head of the pilot and at least one main support 13 secured to the seat back such as by welding. It is to be understood that although only one slipper and boot is shown, that a second slipper is worn on the pilot's other boot coupled to a second retraction means.

A plurality of rollers, such as rollers 14, and a V-shaped block 15 is provided on the seat support so that the basic seat is slidably mounted in guide rails 16 carried by the aircraft structure. The V-shaped blocks reduce launching perturbations by substantially eliminating the transmittal of shear forces to the seat when the seat slides out of engagement with the guide rails.

The basic seat arrangement is provided with flight stabilizing means comprising side fins secured to each side of the seat separated by the pilot such as side fin 17. Each fin carries a vane 18 which is hinged at approximately the middle of the fin and which is aerodynamically deployed upward into a horizontal position when the seat is ejected.

Also, the basic seat arrangement is provided with leg guards for keeping portions of the pilot's body and personal equipment from floundering during ejection and subsequent flight. The leg guards comprise a rod 20 rotatably mounted on the seat and extending beyond the width of the basic arrangement so that a pair of members 21 may be attached to opposing ends of the rod. Mounted on the end of member 21 opposite to its end attached to rod 20, is a knee-brace 22. Attachment of the knee-brace to member 21 may be achieved by suitable means, such as welding for example.

A footrest 23 is provided on seat 11 so that the pilot's feet may be accommodated during ejection. The footrests may be secured to the seat by suitable means such as fasteners, welding, etc.

Figure 2:
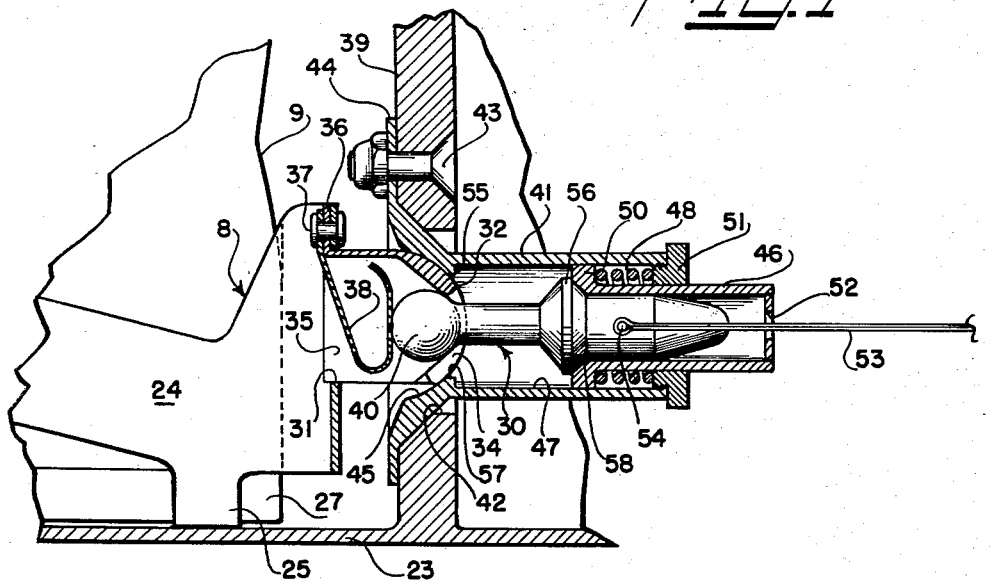
Figure 2 is a plan view of a retraction slipper worn by the pilot over each boot.

With reference to Figures 2 and 3, slipper 8 is shown which is fastened about each boot 9 of the pilot. The slipper comprises, a substantially U-shaped frame 24 configured to fit the boot around the heel and having a plurality of flanges, such as flanges 25 and a pair of flanges 26 protruding interiorly of the U-shaped frame. Flanges 25 are formed at right angles to the frame 24 and are engageable with a heel 27 of the boot (as shown in Figure 4) while flanges 26 engage a sole 28 of the boot. Flanges 26 are formed at an obtuse angle to the frame 24 so as to provide a spring action acting against the sole of the boot. A strap 29 is suitably fastened to frame 24 in a manner securing the slipper to the boot. Preferably the strap is made of resilient materials such as rubber, plastic, etc.

Means are provided for receiving an attachment member 30 associated with foot retraction means 10 by providing a hole 31 in frame 24 through which a socket 32 is inserted having an open ended hollow 33 and a slot 34 connecting the open end 35 of the hollow. Attachment of the socket to frame 24 is achieved by securing a semicircular flange 36 carried by the socket to the frame by means of a plurality of fasteners 37. Fasteners 37 also serve to secure a spring 38 to the frame which extends into hollow 33 of the socket to provide a holding tension on member 30.

Figure 4 illustrates the method of attaching slipper 8 to attachment member 30 whereby the dotted lines represent progressive steps in accomplishing attachment and the solid line represents complete attachment of the slipper to the attachment member 30. The attachment means is normally projected beyond the front 39 of the seat so that a ball 40 carried on the end of attachment member 30 may be received through the open end 35 of the hollow provided in socket 32.

Attachment member 30 is mounted on an element 41 carried on the front of the seat. The element is inserted through a hole 42 provided in the seat and attachment is made to the seat by means of a nut and screw arrangement 43 extending through the seat and an annular flange 44 integrally formed with the element. The element is provided with a conical recess 45 adaptable to receive the rounded socket carried by the slipper when foot retraction means 10 is actuated. This relationship is shown more clearly in Figure 5 wherein it can be seen that socket 32 snugly fits into conical recess 45 of element 41. Attachment member 30 is resiliently mounted in element 41 by means of a holder 46 slidably carried within a bore 47 provided in element 41. The holder is acted upon by a spring 48 within the bore 47 of element 41 expanding against a shoulder 50 carried by the holder and a collar 51 threadably engaged with one end of the element. Holder 46 is provided with an aperture 52 through which passes a strap 53 connecting attachment member 30 to foot retraction means 10. Strap 53 is attached to member 30 by means of a pin 54 secured to the member.

Holder 46 is slidable within bore 47 so that when the shoulder 50 butts against a shoulder 55, annular collar 56 carried on member 30 will be aligned with a hole 57 provided through element 41 and opening into recess 45. Collar 56 is so configured that it will seat properly with a recessed portion 58 in the holder. The alignment of the collar with hole 57 permits member 30 to be withdrawn from holder 46 in response to movement of the pilot's legs after socket 32 has been attached to member 30. This arrangement is readily shown in Figure 6.

With reference to Figure 6, it can be seen that a ring 60 is connected to a pyrotechnic device 61 which is of the type wherein force urging pin 62 outwardly causes a cartridge (not shown) to explode. Device 61 is of a conventional type and is employed to actuate the leg guards prior to ejection of the seat. Gases generated by the explosive charge are transmitted via a tube 63 to a hydraulic actuator 64 suitably fastened to the seat bottom. Actuator 64 comprises a piston 65 slidably carried within a body 66 so that applied gases from tube 63 causes the piston to move within the body. The action of the piston may be dampened by providing a small blowout plug 67 so that progression of the piston within the body forces the hydraulic fluid contained in the body to blow out the plug and thereby permitting the piston to advance through the body. One end of a strap 68 is attached to the end of piston 65 while its opposite end is attached to and wrapped around rod 20 so movement of the piston is translated into rotary movement of rod 20 via the strap. A roller 70 is carried by the seat in order to provide a slight tension on the strap and to take up slack.

In order to cause the retraction of the pilot's feet during an emergency and coincident with the positioning of the leg guards, strap 53 is mounted on a shaft 70 of an actuator 71, as shown in Figure 7, having a cable 72 attached at one end to member 21 near knee brace 22 and its opposite end attached to a take-up reel 73 carried by shaft 70.

It is to be understood that the construction of actuator 71, as shown more clearly in Figure 7, is not intended to form the subject matter of this invention and that any type of suitable retraction mechanism may be employed. For example, in the present instance, an actuator assembly is shown which may be supplied from the Stanley Aviation Corporation, Buffalo, New York. This retraction assembly comprises, in general, a spool 73 for storing cable 72, a locking arrangement 74, a conventional clutch mechanism 75, a take-up reel 76 for storing strap 53, and a conventional coil spring 77 for placing a tension on shaft 70 whereby a slight tension is maintained to take up any slack as strap 53 is drawn from take-up reel 76. One end of shaft 70 is carried by seat 11 while its opposite end is supported by a cover 78 for the actuator assembly and is attached to the seat by means of fasteners 80. The opposing ends of shaft 70 may be disengaged by means of the clutch mechanism 75 when strap 53 is unwound from its reel 76 in accordance with pilot leg movement. However, upon withdrawal of cable 72 from its spool 73, the clutch mechanism causes the engagement of the opposing ends of shaft 70 so that the shaft rotates in accordance with the unwinding of the cable. This action causes strap 53 to be retracted and stored on its reel 76. Locking arrangement 74 prevents shaft 70 rotation in a clockwise direction wherever cable 72 is withdrawn from its storage reel.

Once the pilot's feet have been retracted and retained in position against the seat and the ejection seat is fully separated from the aircraft, a parachute may be deployed at a predetermined time and altitude whereby the pilot separates from the seat. In order to accomplish separation, a conventional reefing line cutter 81 carried by the seat such as disclosed in U.S. Patent 2,755,550 may be employed to sever strap 53 which releases the pilot's feet from restraint and permits complete separation of the pilot from the seat. Cutter 81 is pyrotechnically actuated by applying a pulling force on a cable 82 controlling the firing mechanism (not shown) of the cutter. Cable 82 may be attached on its end opposite the cutter to the parachute, for example.

In operation, pilot 7 puts on a pair of slippers such as slipper 8 over his flying boots while he is in his squadron operational readyroom in such a manner that a pair of flanges 26 engage the sole of each boot and strap 29 secures each slipper to the boot. Upon entering the cockpit of his aircraft, the pilot engages socket 32 carried by each slipper with ball 40 carried by each attachment member 30 which protrudes beyond seat front 39. Coupling is achieved by slipping ball 40 through open end 35 of hollow 33 so that attachment member 30 may slip into slot 34. The attachment member is retained in hollow 33 by means of spring 38 which prevents member 30 from becoming disengaged from socket 32 except when the pilot intentionally causes disengagement.

As the pilot moves his feet in order to control the aircraft, strap 53 attached to member 30 is unwound from take-up reel 76. If the pilot moves his leg rearwardly, spring 77 will cause reel 76 to rotate clockwise to take up slack of strap 53. When the pilot decides to leave the aircraft cockpit after a flight, he raises his foot upward against the tension of spring 38 so that ball 40 may leave hollow 33 of socket 32 and member 30 may leave slot 34. Complete detachment of the slippers from member 30 allows spring 48 to expand urging holder 46 to project attachment member 30 beyond seat front 39. The attachment member is now projected forward of seat front 39 and in proper position to be engaged with socket 32 of the slipper when the pilot re-enters the aircraft cockpit.

However, in an emergency, when the pilot desires to eject himself from his aircraft, ring 60, as shown in Figure 6, is urged upward to actuate pyrotechnic device 61 via strap 83 and pin 62. Firing of pyrotechnic device 61 causes gases to fill tube 63 and to be transmitted to actuator 64. The gases supplied by tube 63 fill body 66 which, in turn, urges piston 65 to travel through body 66 of actuator 64. When compression of hydraulic fluid within body 66 reaches a predetermined compression, plug 67 will blow out from the end of the body to release the compressed fluid through a damping orifice provided by the blown out plug.

The linear stroke of piston 65 is followed by strap 68 which is wrapped around and attached to rod 20. As the strap is progressively pulled by piston 65, it is unrolled from its storage area on rod 20 while simultaneously rotating rod 20, in a counterclockwies direction. Inasmuch as member 21 associated with each leg guard is attached to opposing end of rod 20, the leg guards are pivoted forward from their rearward stowed position in the direction of arrow 85. The stroke of piston 65, which controls the movement of the strap 68, is of sufficient length to pivot the knee braces 22 adjacent to pilot's knees before stopping.

Simultaneous to the pivoting of the leg guards in the direction of arrow 85, the pilot's feet are retracted by means of cable 72 following the movement of member 21 which is unwound from storage spools 73 on which it is stored. The unwinding of cable 72 from its storage wheel causes shaft 70 to rotate counterclockwise which causes the activation of clutch mechanism 75 so that the opposing ends of shaft 70 are differentially rotated. This action causes reel 76 to rewind strap 53 which forcibly pulls the pilot's feet into the position shown in Figure 5. The pilot's feet are prevented from outward movement by means of locking arrangement 74 which prohibits clockwise movement of shaft 70 and consequently clutch mechanism 75 cannot be disengaged to permit clockwise rotation of reel 76.

Having described only typical forms of the invention we do not wish to be limited to the specific details herein set forth, but wish to reserve to ourselves any variations or modifications that may appear to those skilled in the art and fall within the scope of the following claims.

We claim:

1. In an aircraft ejection system including an ejectable seat, retraction apparatus for a pilot's feet comprising, retraction means carried by the seat detachably connected to each foot whereby the pilot's feet are unrestrained and allowed freedom of movement, means attached to the seat for actuating the retraction means to restrain the pilot's feet against the seat, and mechanism carried on the seat for detaching the retraction means from each foot subsequent to seat ejection.

2. In an aircraft ejection system including an ejectable seat, retraction apparatus for a pilot's feet comprising, a slipper having a catch worn on each foot of the pilot, retraction means carried by the seat, latch means connected to the retraction means detachably coupling the catch of each slipper to the retraction means, means for actuating the retraction means to restrain the pilot's feet against the seat, and mechanism carried by the seat for disconnecting the retraction means from each slipper subsequent to seat ejection.

3. Feet retraction apparatus for use in an aircraft escape system including an ejectable seat comprising, a slipper worn on each foot of a pilot, a hollow socket attached to each slipper, an attachment member detachably engageable with each socket, a spring tensioned strap connecting the attachment member to the seat, an element carried on the seat adapted to receive the attachment member, means carried on the seat and connected to the strap for shortening the strap limited by the engagement of the attachment member with the element whereby the pilot's feet are restrained against the seat restricting the movement thereof, and mechanism carried by the seat for severing the strap subsequent to seat ejection.

4. Feet retraction apparatus for an occupant in a seat comprising, a slipper worn on each foot of the occupant, a socket having a hollow attached to each slipper, an attachment member having a ball detachably engageable within the hollow of each socket, spring means carried by each slipper within the hollow of each socket tensioned against the ball of the attachment member, an element carried on the seat adapted to receive the attachment member, a strap having one end connected to the attachment member, resilient means carried by the seat for taking up strap slack, a strap retraction assembly carried by the seat attached to the end of the strap opposite the end attached to the attachment member, means under occupant control for actuating the strap retraction assembly to shorten the strap whereby the occupant's feet are restrained against the seat, and means secured to the seat adjacent the strap for severing the strap to release occupant's feet from the seat.

References Cited in the file of this patent

UNITED STATES PATENTS

| | | |
|---|---|---|
| 561,855 | Baptist | June 9, 1896 |
| 2,528,532 | Martin | Nov. 7, 1950 |
| 2,743,894 | Ostnas | May 1, 1956 |
| 2,765,130 | Replogle et al. | Oct. 2, 1956 |